United States Patent [19]

Bostica et al.

[11] Patent Number: 5,307,343
[45] Date of Patent: Apr. 26, 1994

[54] BASIC ELEMENT FOR THE CONNECTION NETWORK OF A FAST PACKET SWITCHING NODE

[75] Inventors: Bruno Bostica, Pino; Antonella Daniele, Bareggio; Vinicio Vercellone, Venaria, all of Italy

[73] Assignee: Italtel Societa Italiana Telecommunicazioni s.p.a, Milan, Italy

[21] Appl. No.: 859,502
[22] PCT Filed: Nov. 27, 1990
[86] PCT No.: PCT/EP90/02010
§ 371 Date: Jul. 29, 1992
§ 102(e) Date: Jul. 29, 1992
[87] PCT Pub. No.: WO91/08633
PCT Pub. Date: Jun. 13, 1991

[30] Foreign Application Priority Data

Nov. 30, 1989 [IT]  Italy ............................... 68059 A/89

[51] Int. Cl.⁵ ......................................... H04Q 11/04
[52] U.S. Cl. .......................................... 370/60; 370/59
[58] Field of Search ................ 370/60, 94.1, 100.1, 370/68, 62, 59, 58.1

[56] References Cited

U.S. PATENT DOCUMENTS

| | | | |
|---|---|---|---|
| 3,806,886 | 4/1974 | McClellan et al. | 370/59 |
| 4,382,295 | 5/1983 | Moffitt et al. | 370/68 |
| 4,575,844 | 3/1986 | Kosuge et al. | 370/60 |
| 4,912,701 | 3/1990 | Nicholas | 370/60 |
| 4,947,387 | 8/1990 | Knorpp et al. | 370/60 |

FOREIGN PATENT DOCUMENTS

0338558 10/1989 European Pat. Off. .
2504760 4/1982 France .

OTHER PUBLICATIONS

"Switching ATM in a Broadband ISDN"; *Networks 89* Birmingham; Jun. 1988; pp. 115–130.
"Technology Aspects for System 12 Broadband ISDN"; Boettle et al.; *IEEE Journal on Selected Areas in Communications*; vol. SAC-5, No. 8, Oct. 1987; pp. 1242–1248.
"A Shared Buffer Memory Switch for an ATM Exchange"; Kuwahara et al.; International Conference on Communications, Jun. 11–14, 1989.
"An Asynchronous Time-Division Switched Network"; Coudreuse et al. Centre National d'Etudesdes Telecommnications—France 1987.
"The Knockout Switch: A Simple, Modular Architecture for High-Performance Packet Switching"; Yeh, et al., International Switching Symposium 1987 Proceedings; pp. 810–808.
"Considerations on the Structure of an ATM Switch in the Frame Work of a Hybrid BB ISDN Concept"; K. A. Lutz, IEEE COMSOC International Workshop, Nov. 22–24, 1987.

*Primary Examiner*—Douglas W. Olms
*Assistant Examiner*—Shick Hom

[57] ABSTRACT

A basic element for the interconnection network of a fast packet switching node, where a synchronization is made at bit input stream level, the cell beginning is identified and a stream conversion from the serial form to a word parallel form is performed. Cells are thus transformed in a completely parallel form and in the same form they are cyclically discharged in the subsequent cell time in a memory, where cells are written and read in a shared way on the basis of instructions given by a control unit, thus performing the switching function. The control unit is essentially based on the use of a content-addressed associative memory, where a fraction of the routing header and a code indicating the time sequence on which the cells are stored. Memory outgoing cells are reconverted from a completely parallel form to a form having the length of one word and therefore in a completely serial form at a bitrate equal to the input one.

15 Claims, 4 Drawing Sheets

BASIC ELEMENT FOR THE CONNECTION NETWORK OF A FAST PACKET SWITCHING NODE

FIELD OF THE INVENTION

This invention refers to telecommunication systems employing digital signals for the transmission of speech, video and data signals, and in particular it refers a basic element for the connection network of a fast packet switching node.

BACKGROUND

The fast packet switching techniques, called ATM from the first letters of the wording in the English language "Asynchronous Transfer Mode", is going to take on an ever growing importance in the integrated switching of digital streams, belonging to the services for speech signal transmission, video and data signals, with different bandwith requirements and differentiated traffic characteristics. The network foreseeing this kind of service integration, with even more wide bandwith, is called B-ISDN (Broadband Integrated Service Digital Network). This technique meets better than others the requirements of the above mentioned services using an integrated switching structure, open to possible future services with not yet defined characteristics. The resources offered by the switching system are not strictly dedicated to a single call for its all length of time, as in the circuit switching systems, but are used only on demand, when the need arises to transfer information.

As known, this technique foresees that information relevant to the various services is organised in contiguous units with a fixed length of approximately 400 bits, called cells. These are composed by information field and a routing field, called header, carrying the information necessary to the route selection through the connection network and other service information.

Cells are received by line interfaces placed at the input of a switching node, essentially consisting of a control unit and of a structure performing the real switching function. The control unit performs all high level functions related to the call processing, to the configuration of the connection network and to the control of other services. Among these functions, a fundamental is the path finding. This path is decided at the call setup phase and is common to all the cells belonging to the same call. The choice is determined call by call by routing bounds throughout the geographical network and by the bandwith allocation state within the interconnection network.

The structure performing the cells switching operates by converting the header, which validity is just link by link, and the routing of cells of the same call towards the appropriate output through the connection network.

The connection network, which has the function to obtain the space switching of the cells from an input port to an output port, must be able to deliver large traffic volumes, in the range of some hundred Gbit/s, with a low cell loss probability, and low blocking probability. Furthermore, the connection network must show a minimum crossing time and has to be open to further modular growth.

Some connection networks are known at present, based on multistage structures almost non blocking, which employ unblocking switching elements of NN capacity, where N is higher equal to 8.

Each one of these elements controls the space switching of the cells belonging to the same call, which are sent following a path unique per each input-output pair. It works in a self-routing way, since a portion of the header of the cell, called TAG, describes the route of the cell itself through the connection network and in particular the output port of each element, where the cell has to be delivered.

Since it can occur that two or more cells, arrived at different inputs, want to access to the same output port at the same time, it is necessary to foresee an intermediate storage function for the cells which cannot be immediately transferred. One cell can therefore be sent at once to the subsequent stage, while the remaining ones stand-by waiting for the availability of the output port. The known switching elements essentially differ in the way the intermediate storage of cells in conflict is performed.

According to a first method, cells are held in intermediate storages before being sent to the output through a space switching network. The storage memory is usually organized according to a FIFO discipline, in order to prevent inversions in the cells order; however this method has a drawback; in fact if the first cell which entered the memory cannot be switched due to an output conflict, it blocks all the cells arrived later, even if these are adressed towards available outputs. This can be overcome, as described in "Considerations on the structure of an ATM switch in the frame work of a hybrid BB ISDN concept", by Karl Anton Lutz, presented at IEEE COMSOC International Workshop, Nov. 22–24, 1987, Osaka, Japan, using an access algorithm to the memories, not merely FIFO, but this requires a higher complexity of memory control units.

According to another method, described in the paper titled "The Knockout switch: a simple, modular architecture for high-performance packet switching", by Y. S. Yeh and others, published in section B10.2.1 of the proceedings of 1987 ISS, Mar. 15–20, 1987, Phoenix, Ariz., USA, cells are switched towards the desired output through a crosspoint-type network performed through some buses, which operates at a speed higher than the network speed and sufficient to enable, in the worst case, to receive a cell from each input by an output. In particular, the speed increases in proportion to the number of inputs and outputs; that can originate increasing difficulties in the realization of the connection network.

A third method, described in the paper titled "Prelude: an asynchronous time-division switched network", by J. Coudreuse and others, published at section 22.2.1 of the proceeding of the 1987 ICC conference of Jun. 8, 1987, Seattle, USA, foresees that all incoming cells are entered in a common memory in the switching element and that cells are drawn from the same, through an adequate control algorithm, already switched to be sent to the appropriate output. The storage is thus considered as an area to which each output port can have free access; this storage is therefore completely shared by all output ports. On the contrary, each input port is able to enter only to a dedicated area, so whenever this area fills up, the subsequent cells arriving to that input cannot fill up other free storage areas, assigned to other inputs. Therefore the capacity of the common storage cannot be completely employed.

Moreover, due to the way cells are stored, the capacity of each memory element must be equal to the number of 8-bit bytes of the cell, which heavily decreases the system flexibility in view of possible format modifications of the cells to be treated.

Finally it must be highlighted that, with equal performances from the loss probability point of view and on equal traffic conditions, the storage schemes realized in the first two solutions require a storage capacity globally higher than the one necessary in the third solution, since storage is not shared in any way, neither at input nor at output. The structures proposed in the article "A shared buffer memory switch for an ATM exchange", by Hiroshi Kuwahara and others, published at sect. 4.4.1 of the proceedings of ICC89 conference, Jun. 11-14, 1989, Boston, USA and in "Switching ATM in a Broadband ISDN", by A. J. Wiley, published on page 115 of the proceedings of Network 89 conference, Birmingham, Great Britain, can also be considered, in which cells storage is such to enable the access to a same storage area by all input and output streams, with a consequent save in the required total storage capacity. The realization of the shared access in the storage area is also such to entirely free the number of the inputs and outputs of the elements from the cell length. Access is controlled by a control unit employing a second storage area, where pointer linked lists to the data memory are realized. However, these solutions require in the second storage area an operational speed at least double than that required in the data memory.

SUMMARY OF THE INVENTION

The basic element for the connection network of a fast packet switching node, subject of the present invention, can obviate these disadvantages, since it employs a technique for cell storage useful to minimize the amount of circuitry required for its implementation. The realization of the shared access to the storage area furthermore does not require element operation speeds higher than those defined by the speed of data flows, being also completely independent from the number of inputs and outputs of the element from the cell length.

An object of this invention is a basic element for the connection network of a fast packet switching node.

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

These and other characteristics of the present invention shall better be clarified by the following description of a preferred form of realization of the same, given as an example but not limited to, and by the attached drawings, where:

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENT

Figure 1:
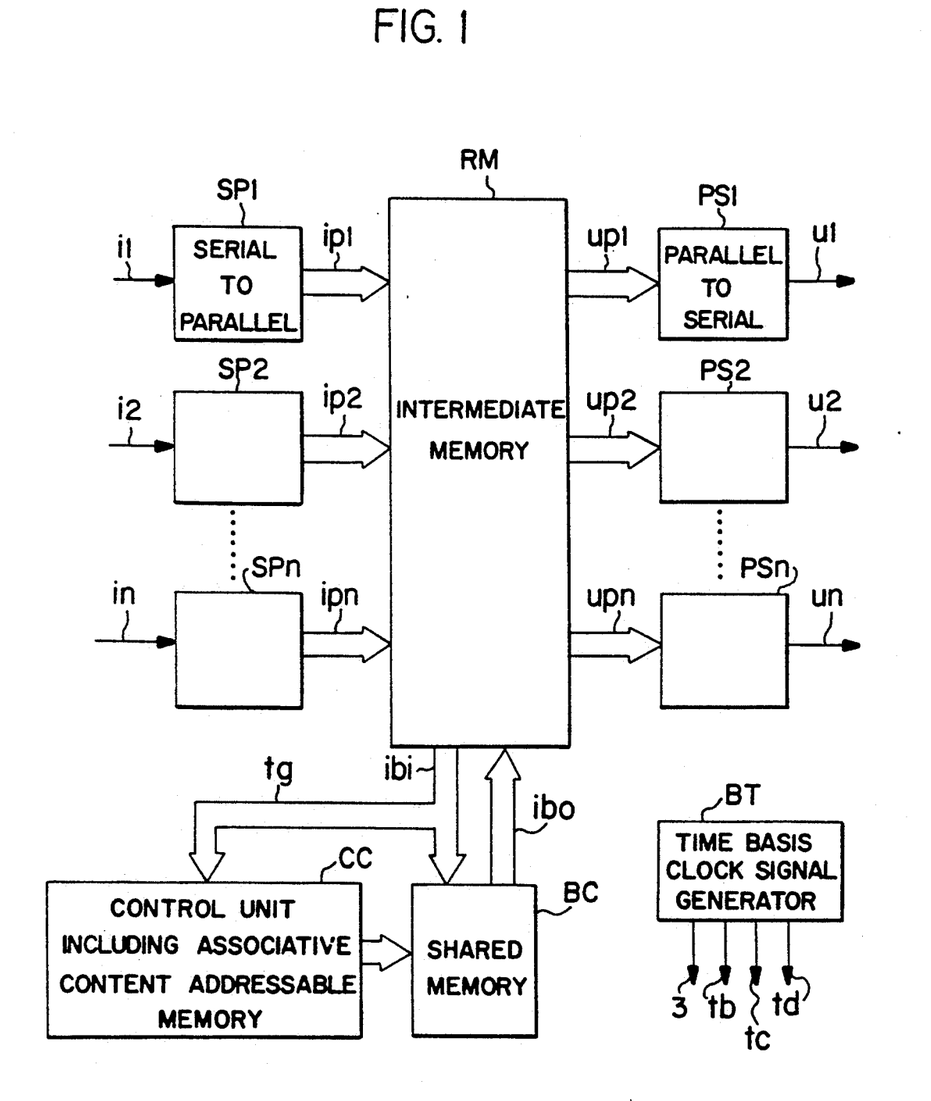
FIG. 1, is a general block diagram of the basic element.

The functional block diagram of the basic element for the connection network is shown in FIG. 1.

Through input ports i1, i2, ... in and output ports u1, u2, ... un, serial information streams transit at a bitrate in the range of 150 Mbit/s, made of contiguous cells having fixed length, formed by a number m of 8-bit bytes equal approx to 50. As already said, cells are made of an information fields and of a header containing the VCI (Virtual Call Identifier), which identifies the code of the call to which the cell belongs, for that node, and service information. The field containing the virtual call identifier VCI, is treated in line interfaces of the switching node located at the input of the interconnection network. In particular, it is used to address a memory, which supplies the new VCI that has to be associated to the cell for the connection between two adjacent nodes and also, it supplies a field whose bits are used for the routing of the cell itself through the elements of the interconnection network. The new VCI and the routing field are written in the abovementioned memory on the basis of information received at the moment of the call setup by the node controllers. At each stage of the network, consisting of elements making the object of the present invention duly interconnected, a fraction of this new routing field is used and shifted to the field left, which shall be used in the subsequent stages.

A code is inserted at the beginning of the cell and it shall be used by the elements of the interconnection network to detect the cell start.

Each serial input stream, though it is isochronous with the other streams, has in general a different phase at bit and cell level due to the different length of interconnections among the different stages of the network. It is therefore required to introduce, for each input connection, a block restoring the correct phase relations. Inside these blocks, called in the picture SP1, SP2, ... SPn, a synchronization at bit level of the input stream with the element clock signal, distributed by a time basis BT on wire 3, is performed. The start is detected and a stream conversion from the serial form to an 8-bit parallel form, supplied at the output on connections ip1, ip2, ... ,ipn, is performed.

The time basis BT sends on wire 3 the element clock signal having a period equal to the bit time, on wire tb a clock signal with period equal to one half of the 8-bit byte time, on wire tc a clock signal with period equal to two cell times (a cell time is the time necessary to transmit a cell towards the line) and on wire td a signal having a period equal to two cell times but with two different phases, one having a length equal to n cycles of 8-bit byte and the other one equal to the remaining 2m-n 8-bit byte cycles.

Connections ip1, ip2, ..., ipn, access to a block RM in which cells are transformed in the cell parallel form (the approximately 400 bits constituting a cell are emitted in parallel in the same instant) and in this form are cyclically discharged in the subsequent cell time on the connection ibi, consisting of a number of wires equal to the cell bit number, towards a block BC. This last block is made of a memory in which cells are written and read in a shared way on the basis of instructions given by a control unit CC, thus performing the switching function.

The control unit CC is essentially based on the use of a content-addressed memory, of the CAM type (Content Addressable Memory). In this memory a fraction of the routing header, present on the group of wires tg forming part of the ibi connection and relevant to the stage of the connection network to which the element considered belongs, is stored. A code indicating the time sequence of cells arrival, relating to the output specified by the abovementioned header fraction is also stored.

Using this information the control unit CC controls the selection of the appropriate cell when reading, inside the shared memory BC. When writing, cell addresses are identified starting from a bit associated to each memory location, indicating its state.

Cells outgoing from the BC memory newly enter the RM block through the ibo connection. The RM block reconverts them from the cell parallel form to a form having 8-bit parallel length, made available on connections up1, up2, ... ,upn.

Blocks PS1, PS2, ... , PSn carry out the conversion of these streams in a completely serial form at a bitrate equal to the input one and supply them on wires u1,u2, ... , un. These are realized with shift registers, parallel loaded with a parallel 8 bit wide bus and read in a serial way at the speed determined by a clock signal supplied by the switching element time basis.

Figure 2:
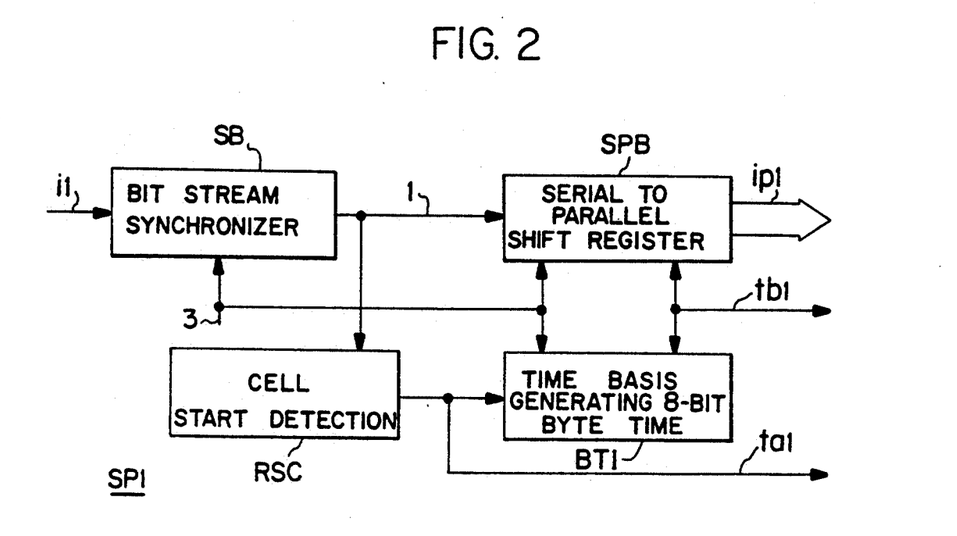
FIG. 2, is a block diagram of the block marked SP1 in FIG. 1.

Details of one of input blocks is given in FIG. 2, e.g. the one indicated by SP1. The serial stream at the element input on wire i1 is aligned by the block SB with the element internal clock signal, having bit frequency, present on wire 3. The block SB shows a structure which can be carried out according to known diagrams, e.g. according to the diagram shown in FIG. 6 of the article titled "Technology aspects for System 12 Broadband ISDN", by Dietrich Boettle and others, published on page 1242 of IEEE Journal on selected areas in communications, October 1987.

The output stream on wire 1 access to an RSC block, where the cell start signal is detected and a corresponding signal is generated, sent on wire ta1, with a synchronization function for the time basis BTI, which supplies at its output on wire tb1 a 8-bit byte time for the conversion of the serial stream present on wire 1 in the parallel form on eight bit, supplied on connection ip1 by a shift register SPB. The block RSC is a finite state machine which detects the cell start, triggering an appropriate synchronism code written at the beginning of the cell itself, as previously said. Both the signal on wire ta1, and the signal on wire tb1 are used for cells writing in block RM (FIG. 1), as it shall be described hereafter.

Figure 3:
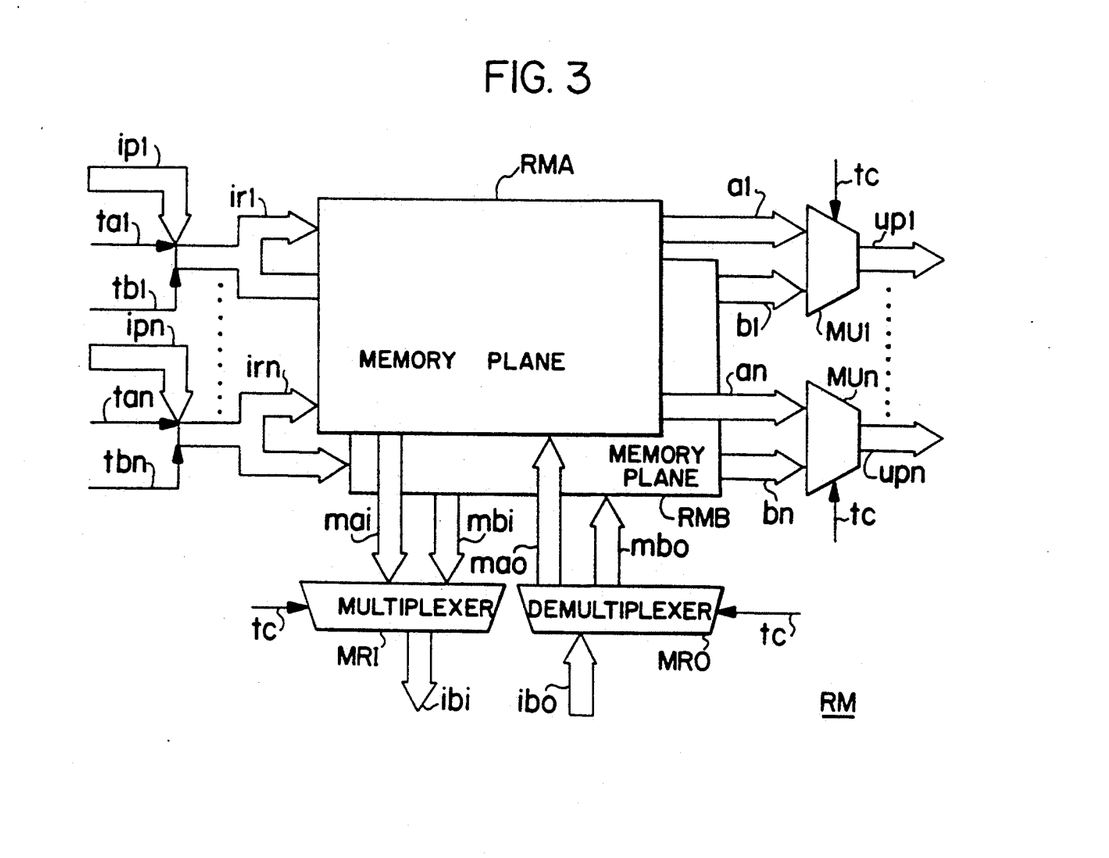
FIG. 3 is a block diagram of the block marked RM in FIG. 1.

FIG. 3 shows the block RM, essentially consisting of two memory planes RMA and RMB. In one of the two memory planes, RMA for instance, cells are stored 8-bit byte after 8-bit byte, arriving, not necessarily in phase, at n inputs ip1, ... , ipn in a cell time. Cells stored shall be discharged in the subsequent cell phases through a connection mai, a multiplexer MRI and the connection ibi towards the shared buffer marked BC in FIG. 1. The multiplexer MRI is controlled by the signal coming from the element time basis on wire tc.

At the same time, the cells received by the same memory plane RMA in the previous cell phases from the block BC of FIG. 1, through the connection ibo, a demultiplexer MRO and a connection mao, are discharged towards the outputs up1, ... upn through the connections a1, ... an, and multiplexers MU1, ... , MUn. All these multiplexers are placed in such a way as to receive the outputs of the digit plane RMA from the same signal on wire tc, obtaining time aligned cells (the first byte of each cell is synchronized in the time with the first byte of others cells) at the module output.

Always in the same time phase, the n cells stored in the previous cell time are discharged in sequence in the cell parallel form from the other memory plane RMB towards the connection ibi through a connection mbi and the multiplexer MRI. This operation is made in n cycles, subsequent and clocked by the clock signal supplied on wire tb by the element time basis BT (FIG. 1).

It must be noted that the length of time in which the n cells are completely discharged towards the connection ibi is equal to $n*2*tb$. As n is generally lower than m (for instance, n=8, 16 or 32; m=50) and the discharging operation of cells towards BC (FIG. 1) takes place in the second phase of time td, having a length of n times of 8-bit byte, an interval is left which can vary from 0 to m-n 8-bit byte times, depending on the moment of the cell arrival. This interval is used in the sequence charging plan RMB to compensate the dispersion of delays of input cell starts versus the cell time reference present on wire tc.

At the same time, from the ibo connection the switched cells coming from the memory BC (FIG. 1) are loaded in the cell parallel form through the demultiplexer MRO and a connection mbo in plan RMB in n subsequent time phases generated by the clock signal tb.

Figure 4:
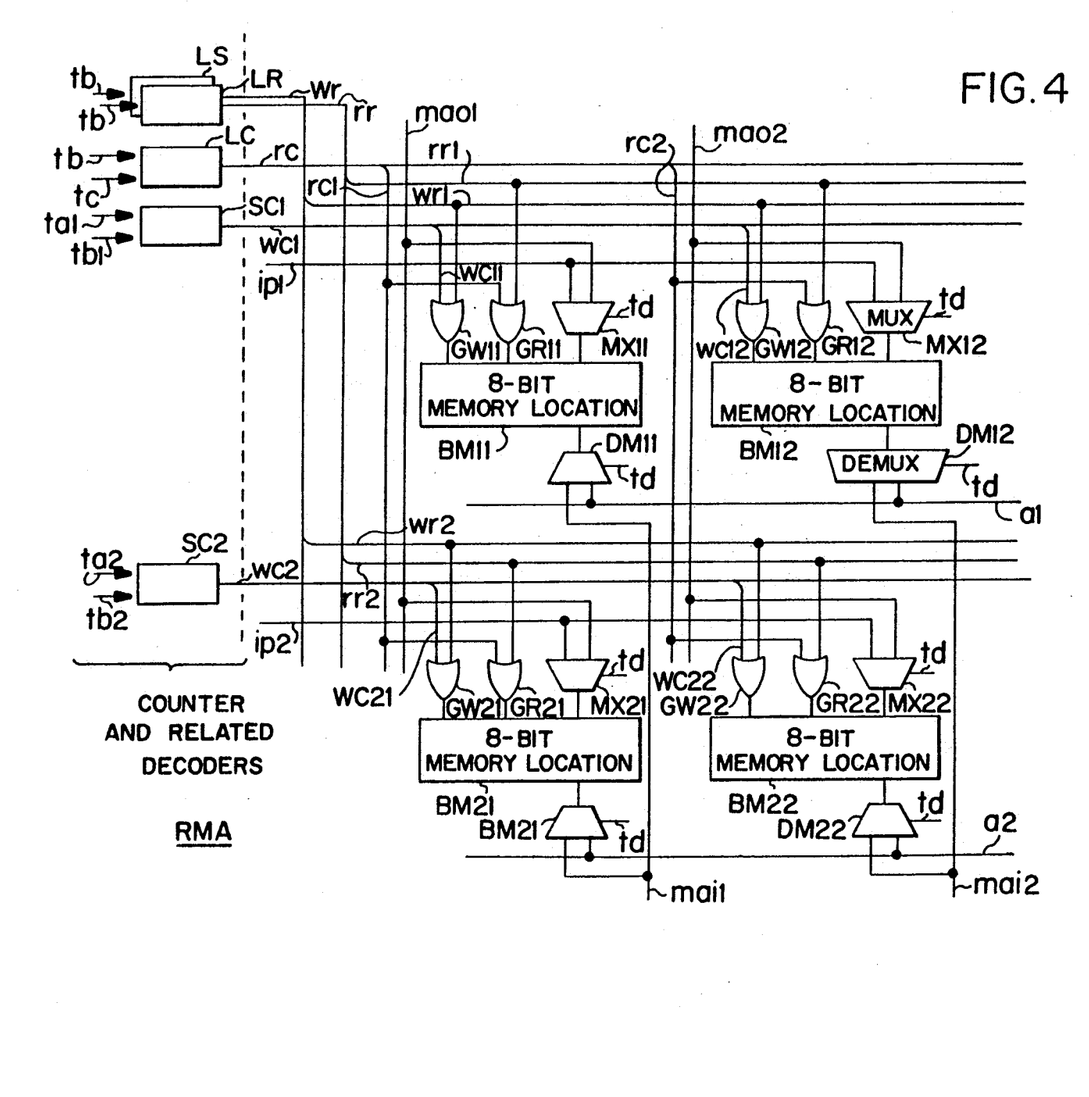
FIG. 4, is a block diagram of the bloc marked RMA in FIG. 3.

FIG. 4 shows one part of a digit plane, e.g., RMA. It is made of an 8 bit ($i=1, ..., n; j=1, ..., m$) location matrix $BM_{ij}$, arranged in n lines and m columns, whose locations are represented placed at crossings of the first two lines with the first two columns. Each line contains the cell which has to be written in the cell storage BC or coming from this last; each column contains 8-bit bytes coming from the n inputs or which have to be sent to the n outputs.

In one of the two memory plans, RMA in this case, cells arriving at the n inputs ip1, ip2, ... , ipn are stored in a cell time. The storage takes place under the control of signals on wires ta1, ta2, ... ,tan, and tb1, tb2, ... tbn, supplying for each input the 8-bit byte sunchronism and the cell clocking, respectively, necessary to the logics SC1, SC2, ... , SCn for the memory plans routing to control the correct access to the 8-bit byte column which must be written in the considered phase, through wires wc11, wc21, ... , wcnm, belonging to connections wc1, wc2, ... , wcn.

The reading of the cells previously stored on the plan considered takes place under the control of an appropriate clocking logic LC linked to the internal clock signal tb and tc; it routes in writing the homonym 8-bit bytes, that is those occupying the same position inside the cell, belonging to the cells contained in the different lines of the matrix through the signals on wires rc1, rc2, ... , rcm of the connection rc.

Concerning the access to the common storage, it is controlled by two addressing logics LR and LS, which supply a reading and writing address of the matrix lines in the two appropriate phases on connections wr and rr through wires wr1, wr2, ... ,wrn and rr1, rr2, ... , rrn.

In this way at each 8-bit byte time tb the reading of the content of one line to dump towards the cell memory and the writing of the cell memory content in the same line can be performed. Blocks SC1, ... ,SCn, LC, LR and LS are essentially made of counters and related decoders.

Reading and writing control signals of locations BMij are obtained through the ports OR GR11, GR12, ... ,GRnm and GW11, GW12, ... , GWnm to which the inputs, the row and column reading signals and row and column writing signals are sent respectively.

The data input port of the generic location BMij receives the information on 8 bit coming from the connection ipi or from the connection maoj through a multiplexer MXij (MX11, MX12, ... ,MXnm); likewise on the output side MBij supplies the data or towards the connections a1, ... , an or towards the connections mai1, ..., main, through a demultiplexer DMij (DM11, DM12, ... ,DMnm). Multiplexers MXij and demultiplexer DMij are controlled by the signal on wire td, outgoing the time basis BT (FIG. 1).

Figure 5:
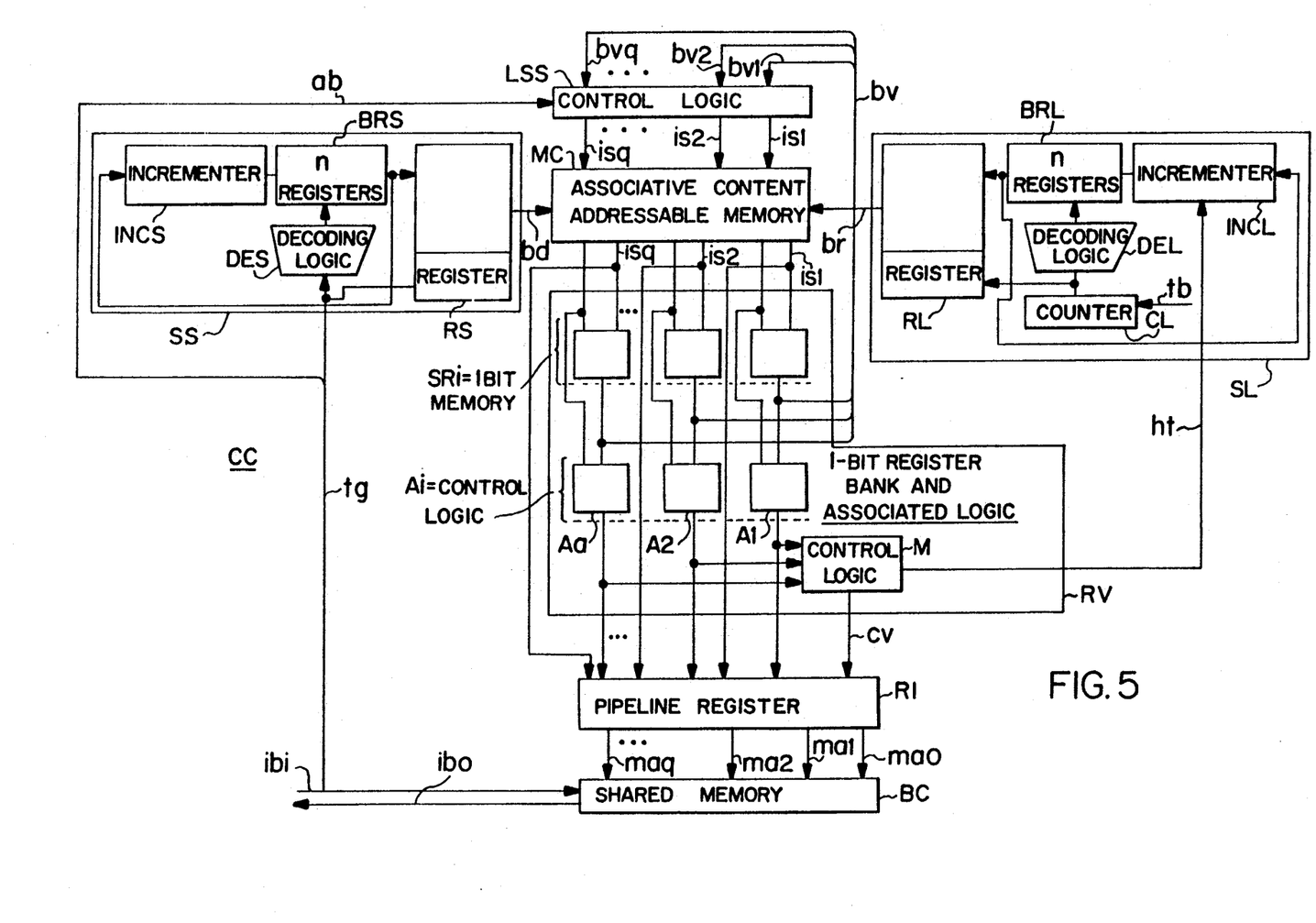
FIG. 5 is a block diagram of the block marked CC in FIG. 1.

The control unit CC is shown on the block diagram of FIG. 5, where to better clarify it is also shown the shared memory BC. The purpose of CC is to take care of the selection of the locations of the shared memory BC, both for the writing phase and for the reading phase of cells.

The operational requirements this unit has to meet are:

the identification of locations which in each phase become free and therefore which can be used for the storage of cells arriving from block RM (FIG. 1), inside the shared memory BC: this is the writing operation;

the sorting of BC cells to be sent to block RM (FIG. 1), in order to observe their order of arrival, that is performing a control of the FIFO type (first-in first-out) of cells stored for each output: this is the reading operation.

The control unit CC, as already said, includes an associative content-addressed (CAM) memory MC. This memory has a number of locations q, equal to the number of the BC memory less one, one of the BC locations being destined to store the empty cell configuration. Each MC location is in fact strictly associated to the corresponding one in BC, in such a way that the memory word contained in MC can be conveniently seen as an extension of the corresponding word of the BC memory. The employ of a content-addressed memory, in this configuration, enables to reduce to a number of words equal to BC ones the quantity of memory required to address its cells. At the same time it allows to supply a sorting of BC words already completely decoded.

The control unit CC includes also a writing sorting logic LSS, having q inputs and as many outputs, corresponding to the number of words present in MC. It makes a filtering action on logic signals present on the connection of the bv input, consisting of wires bv1, bv2, ... ,bvq, which consists in transferring a single active signal among those found simultaneously active at its inputs, to the corresponding outputs is1, is2, ... ,isq. The sorting strategy can be considered arbitrary since it is not important for the operation of the control mechanism which shall be described hereinafter. For instance, the sorting could maintain active the output corresponding to the input with a lower index. The block LSS is also equipped with a further control input, brought to the block on the wire ab belonging to the connection tg, which has the function to inhibit outputs activation, which in this case are all placed at the same zero logic value. An easy implementation of this logic function, even if not the best one from the speed point of view, is a daisy chain structure.

The MC memory is also connected through a connection bd to a block SS, with the function to supply the data to write to MC from time to time in the location sorted by the logic LSS. The block SS is composed by a register bank BRS, made of n registers, as many as the element inputs or outputs are, addressed by the wire group tg, by an incrementer block INCS and by a register RS.

The data, which is stored in the register RS to be written in MC, is made of two bit fields put close together: one field which is directly received by the wire group tg of the connection ibi and one field coming from the register bank BRS.

The first field identifies the output, among the n outputs of the switching element, to which the cell is destined. This field is also used to address the content of the corresponding register inside the bank BRS through a simple decoding logic DES. The content of this register, forming the second field of the register RS, supplies the information of the time sequence belonging to the cell under writing. During the switching element initialization phase, the content of all BRS registers is setted equal to zero. Furtherly, when each register is addressed by tg through DES decoding, its output content is transferred both to register RS, and to the incrementer INCS to be incremented by one unit. The value so updated is thus written again in the same origin register. Whenever a cell destined to a given output is received, its sequence number, destined to assure the coherence of the order in which the cells have been queued in the shared memory BC during the subsequent reading, as well as the univoque result of the associative search, must be modulo q incremented.

The block marked SL is very similar to the block SS now described. It has the function to supply to memory MC, through the connection br, the data which must be searched from time to time inside the memory itself. This data corresponds to the presence in the shared memory BC of one cell destined to a determined output and having a definite location in terms of arrival order. Even this block SL is made of a bank of n registers BRL, addressed this time by a counter CL through a decoding DEL, by an incrementer INCL and a register RL.

The two fields making the content of the register RL have just the function to specify to the sort mechanism the characteristics of the cell already noted above, that is: the output to which the cell is destined and its time order. The first field, identifying the output, is generated by the counter CL, which increments according to the rhythm determined by the clock signal present on wire tb, already examined. The counting supplied by CL, besides being stored in the register RL, is also used to address the register bank BRL through a decoding DEL. BRL register when addressed supplies the second field to the register RL, containing the information of time order relevant to that output of the switching element. It must be noted that for each output of the element the information on time order according to which cells are written and read is very important, since the order according to which cells are to be sent to the outputs must observe the order they are received, as previously said.

Even for block SL, the second field RL is sent to the incrementer INCL to be written again in the same register, increased by one unit or possibly unchanged, depending on the state of the signal on wire ht. This signal carries the information on the search result inside MC of the word presented by the register RL. If the search was successfull, that is if the word is present in MC, the signal on wire ht increases in INCL the content of the register of addresses BRL; if unsuccessful the content of the register itself remains unchanged.

The control unit CC includes also a block RV which is made of a rank of 1 bit registers SR1, SR2, ..., SRq, in the same number as words contained in MC, that is q. It also contains the blocks A1, A2, ..., Aq having the function to generate the reading sorting for BC and a block M which generates the abovementioned ht signal and the denied signal of this one on the wire cv.

The block RV maintains, for each one of the words present in MC, through the state of SR1, ..., SRq, an information on the present validity of the content of the subject word this information defines in fact if the word to which it refers has already been used and therefore it can be written again with a new word, or if it has a still valid content. In this second case the BC corresponding word contains a cell which is still waiting for its turn to be sent towards the required output Finally the control unit CC includes a block RI, made both of an address register of (q+1) bit which, maintaining steady the sorting processed by the control unit during the previous cycle, enables to create a superimposition among the access cycles to memory MC and to memory BC, and of multiplexers necessary to alternate on this register the inputs supplied by the block LSS on wires is1, is2, ..., isq and those coming from blocks A1, A2, ... Aq of RV.

The content addressed memory MC is able to operate as a conventional memory during the writing phase. The outputs of the LSS logic, select the location where the writing of the word supplied by the register RS has to be made, putting at the same time at the logic state one the corresponding registers in the rank SR1, ... ,SRq of RV, thus indicating that the location itself was occupied by a valid word. In the same way LSS outputs are stored in the register contained in RI, where they shall be required to address the location of the BC memory where the cell coming from RM shall be stored (FIG. 1).

During the associative search phase, the content supplied by the register RL is on the contrary compared in parallel to all the words present in MC. The comparison result, relative to each MC location, is made available at output by MC on the group of 2q wires directed towards RV block. In fact this group of wires is made of as many wire pairs as are the MC location, one wire for the comparison result and the other one (is1, is2, ... ,isq) for the same sorting signal sent by LSS to MC. Each pair of wires is connected to the inputs of the corresponding register of the rank SR1, ... ,SRq contained in RV, whose state is newly resetted any time the comparison result indicates that the corresponding data, contained in MC, matches the one presented on the connection br. For this reason the outputs of each register Sr1, ... ,SRq and the corresponding signal generated by MC have access to the inputs of a block in the rank A1, A2, ... ,Aq, inside which the signal carrying the comparison result is conditioned by the information of validity of the relative MC word, represented by the register state of the rank SR1, ... ,SRq, producing the final outputs of RV, which shall be stored in the register contained in RI.

The block M, by processing the state of all these final outputs, detects if one of them is active, thus generating the signal on wire ht, used to drive the incrementer INCL in SL.

Finally, while on one hand the signals coming out from registers SR1, ... ,SRq of RV identify all the free MC locations and which can therefore be used to wire new data, through the connection bv and the logic LSS, on the other hand, the same signals have also the function to define which one of the locations of MC which had a positive result in the associative search, contains also a currently valid word. Only in this case the positive result is transformed by the rank of blocks A1,...,Aq of RV in the sorting of the corresponding location of memory BC, through the register RI.

In summary, the operation sequence of the control unit CC is in short the following. A time phase, corresponding to a 8-bit byte time, is divided in two parts. In the first phase, the cell to store in the BC memory is present on the connection ibi. If the cell is not empty, which condition is indicated by the signal on the wire ab, the field identifying the output to which the cell is destined is present on the group of wires tg belonging to the above mentioned connection. The signals on tg contribute both directely and indirectly through the register bank BRS, to form the content of register RS, which is then written in MC. This data, written in the MC memory, is in fact the information necessary to the subsequent recovery of the corresponding cell which shall be stored in the BC memory in the time phase immediately subsequent. If on the contrary the signal on wire ab informs that it is an empty cell, LSS will not generate the writing address and consequently the writing shall not occur neither in MC, nor in BC.

In the second phase, there is the possible real writing of the cell, still present on the connection ibi, in the BC memory. To this purpose the address which the LSS logic, through the register contained in RI and the corresponding multiplexers generated in the previous phase, during which it needed to the writing in MC, is used again.

In the meantime in this same phase the control prepares the address of the BC location whose content, in the subsequent reading cycle, shall be transferred to RM through the output connection ibo. During this phase, infact, the MC memory is the object of the associative search of the word supplied by the register RL of block SL. In case this search is unsuccessful, this means that in BC no cell for the specified output is present; consequently the block M generates the ht signal, which function has already been examined, and its complement cv which is stored in the approrpiate register of RI. This signal become therefore the sorting signal ma0, addressing the BC location which contains the empty cell code to transmit to the output. The cycle is again repeated with a phase in which a writing operation in MC takes place, while in BC memory it takes place the reading of the cell addressed from the active sorting line among the ones, ma0, ma1, ... , maq outgoing RI.

The shared memory BC is a random access memory (RAM) with separated input and output connections, ibi and ibo respectively, both consisting of a number of wires equal to the number of bits of one cell (m*8 bit).

This memory is made of (q+1) locations; the value of q is defined by statistical evalutations and is in the range of 150; the location addressed by the ma0 wire contains an empty cell code. At each cell time all the information stored in one of the two planes RMA or RMB (FIG. 3) of the RM block are transferred in the BC memory with a clocking equal to the 8-byte time and in the first half of this time, on the basis of decoded addresses supplied by the control unit CC on lines ma0, . . . , maq. In the second half of each 8-bit byte time, the switched cells are read by the cell BC memory, which are made available on the ibo connection. In case no cells are directed to a particular output, the control unit CC sends the empty cell code to the connection through activation of the decoding wire ma0 of the first cell of the BC memory, in which this code has been charged during the element initialization phase.

It is clear that the above description has been given as an example but not limited to it.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A basic element for the connection network of a fast packet switching node, for operating on contiguous units of bits called cells having fixed length and formed by an information field and by a header, expressed with a number m of words, comprising:

a plurality of circuits that receive at their input ports serial information streams, made of contiguous cells, and that synchronize each input stream at bit level, to detect the cells' beginning, respectively, and to convert the input streams from serial form to word parallel form;

a time basis;

a transformation memory in which incoming cells in the word parallel form are transformed to cell parallel form and in which outgoing cells in cell parallel form are transformed to word parallel form;

a shared memory in which cells are written and read in a shared way, thereby performing a switching function;

a control unit, controlling the reading and writing operations in said shared memory;

a conversion circuit performing the conversion of streams outgoing the memory block in serial streams at a bitrate equal to an incoming bitrate; said memory transformation comprises at least a first and second plane memory, in said first plane memory are stored word after word in a cell arrival time order, the cells arriving on different instants from said plurality of circuits, and substantially concurrently cells which the first plane memory plan received from the shared memory are discharged through a multiplexer controlled by a single signal, obtaining at an output cells synchronized in time, while substantially in time phase, cells stored in a previous cell time are discharged in cell parallel form from the second plane memory towards the shared memory through the multiplexer and switched cells coming from the shared memory are changed to cell parallel form through a demultiplexer.

2. A basic element as in claim 1, wherein each one of said plane memories includes:

at least one matrix of locations for said words, organized in rows and columns, where each row contains a cell which must be written into the shared memory or which comes from the shared memory, and each column contains words coming from inputs or words which have to be sent to outputs of said plane memories, respectively;

a plurality column routing logics to control writing in each single column, under control of synchronization signals for words and for cells released by said conversion circuits, substantially regardless of any dispersed delays of cell start signal at the inputs;

a clocking logic synchronized with first and second synchronizing signals released by said time basis for routing in reading of homonym words;

at least two line routing logics of the lines of said matrix under reading and writing, synchronized by said first synchronizing signal released by said time basis;

enablement ports for enabling said locations to line and column reading operations and line and column writing operations, on the basis of signals released by said column and line routing logics, respectively, and said clocking logics;

a plurality of input multiplexers through which the words coming from the inputs or from said shared memory are sent to said locations;

a plurality of output multiplexers through which words coming from said locations are sent either to the outputs or to said shared memory.

3. A basic element as in claim 1, wherein said control unit includes a content-addressed associated memory, having a number of locations, equal to a number of locations in said shared memory less one, where a fraction of a cell heading is stored, relevant to the routing, and a code indicating a time sequence of arrival of cells, relating to output of said fraction, said control unit using this information to control sorting during reading of a cell inside the shared memory, while in writing cell addresses are identified starting from a bit associated to each memory location, which indicates a busy state.

4. A basic element as in claim 3, wherein said control unit (CC) includes;

a sorting logic for writing, having a number of inputs and outputs equal to a number of words present in said associative memory, which transfers to corresponding outputs a single active signal among those active at the same time at its inputs according to a predetermined criterion, and outputs can be inhibited through a control wire;

a first transfer circuit to supply through a first connection to said content-addressed associative memory the data to write in a location selected by the sorting logic;

a second transfer circuit to supply data which is to be searched searched for inside the content-addressed associative memory, through a second connection to said content-addressed associative memory;

a third transfer circuit which keeps for each one of the words present in the content-addressed associative memory information on present validity of a content of each word;

a fourth transfer circuit which enables alternating at the output signals supplied by the sorting logic with those coming from the third transfer circuit, maintaining the respective signals steady for an access cycle to the shared memory.

5. A basic element as in claim 4, wherein said first transfer circuit includes:
- a register bank having a number of registers equal to a number of the basic element's inputs or outputs, addressed through a decoding from said fraction of the cell heading;
- an incrementer receiving a content of a register in said register bank and re-writes said content incremented in the same register;
- a beta register, in which is written the fraction of the cell heading and the content of said register in said register bank forming the data to write in a location of said content-addressed associative memory through said first connection.

6. A basic element as in claim 4, wherein said second transfer circuit includes:
- a counter generating a binary digit which increases as a function of a clock signal;
- a register bank having a number of registers equal to a number of the basic element's inputs or outputs, cyclically addressed through said binary digit through a decoding;
- an incrementer receiving a content of a register in said register bank and which writes said content incremented in the same register, when enabled by an increment signal;
- one gamma register, in which the binary digit generated by said counter and the content of said register in said register bank forming data to be found in a location of said content-addressed associative memory through said second connection, are written.

7. A basic element as in claim 4, wherein said third transfer circuit includes:
- a bank of 1 bit registers, in a number equal to that of a number of locations of said content-addressed associative memory and having an input connected to the corresponding content-addressed associative memory output, on which a comparison result is available and another input for a sorting signal generated by said sorting logic, outputs of the registers of the register bank being connected to inputs of said sorting logic;
- a bank of holding circuits, in a number equal to a number of locations of said content-addressed associative memory and having an input connected to a corresponding content-addressed associative memory output, on which a comparison result is available, and another input for a conditioning signal drawn at the output of a corresponding register of said bank of 1 bit registers;
- a delta block which generates a signal and its complement if one of signals outgoing said bank of holding circuits is active and sends said signal and its complement to the second transfer circuit and to the fourth transfer circuit block, respectively.

8. A basic element as in claim 1, wherein serial information streams have access to input ports of said plurality of circuits, further including:
- a fifth transfer circuit for the alignment of serial streams with a clock signal having bit frequency generated by said time basis;
- a sixth transfer circuit having a finite state machine, in which is detected a beginning of a cell outgoing from said fifth transfer circuit indicated by a corresponding indicator signal;
- a time basis, synchronized by the indicator signal generated by the sixth transfer circuit and for generating a word clocking signal; and
- a shift register to perform serial conversion of a stream supplied by the fifth transfer circuit in a word parallel form, under control of the word clocking signal supplied by said time basis.

9. An apparatus in an interconnection network of a fast packet telecommunications switching node comprising:
- at least two serial to k-bit byte parallel input converters;
- a transformation and reconversion memory, having a number of input ports corresponding, and operatively connected, to the at least two converters, and having a number of output ports corresponding to the number of input ports, for transforming at least one grouping of m discrete bytes from the input ports into an m×k bit incoming cell and for storing at least one incoming cell;
- at least two k-bit byte parallel to serial output converters, the output converters being commensurate in number to the input converters and operatively connected to the transformation and reconversion memory;
- a shared memory for storing at least one cell, operatively connected to the transformation memory, to input incoming cells from, and output outgoing cells to, the transformation and reconversion memory, such that the cells are written and read in a shared way; and
- a switching control means for controlling when cells stored in the shared memory are output as outgoing cells to the shared memory;
- wherein the transformation and reconversion memory stores at least one outgoing cell from the shared memory and reconverts each outgoing cell into a grouping of m discrete k-bit bytes and then outputs that grouping on its output ports to the output converters; and
- the control means operating such that switching of the cells from at least one particular input port to at least one particular output port is achieved.

10. An apparatus as in claim 9, wherein the control means comprises:
- a content-addressable associative memory.

11. An apparatus as in claim 9, wherein:
the shared memory and the transformation and reconversion memory are operatively connected by a bus m×k bits wide.

12. An apparatus as in claim 9, wherein:
the control means is also operatively connected to the transformation and reconversion memory such that a cell fraction of each incoming cell input to the shared memory from the transformation and reconversion memory is also communicated to the control means,
the control means controlling switching as a function of the cell fraction.

13. An apparatus as in claim 12, wherein:
the cell fraction comprises time sequence information of the cell.

14. An apparatus as in claim 12, wherein:
the cell fraction comprises routing information of the cell.

15. An apparatus as in claim 9, wherein the transformation and reconversion memory comprises:
- at least one memory for transforming and storing of incoming cells and at least one memory for storing and reconverting outgoing cells.

* * * * *